(12) United States Patent
Jung et al.

(10) Patent No.: US 11,197,340 B2
(45) Date of Patent: Dec. 7, 2021

(54) METHOD AND APPARATUS FOR SETTING DISCONTINUOUS RECEPTION VALUE IN WIRELESS COMMUNICATION SYSTEM

(71) Applicant: Samsung Electronics Co., Ltd., Suwon-si (KR)

(72) Inventors: Sangyeob Jung, Suwon-si (KR); Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/831,224

(22) Filed: Mar. 26, 2020

(65) Prior Publication Data
US 2020/0314949 A1   Oct. 1, 2020

(30) Foreign Application Priority Data
Mar. 28, 2019   (KR) .................. 10-2019-0036206

(51) Int. Cl.
*H04W 4/00*   (2018.01)
*H04W 76/28*   (2018.01)
*H04W 8/02*   (2009.01)

(52) U.S. Cl.
CPC ............. *H04W 76/28* (2018.02); *H04W 8/02* (2013.01)

(58) Field of Classification Search
CPC ......... H04W 8/00; H04W 8/02; H04W 76/00; H04W 76/20; H04W 76/28
See application file for complete search history.

(56) References Cited

U.S. PATENT DOCUMENTS

| 2005/0176474 A1* | 8/2005 | Lee | ..... H04B 7/26 455/574 |
| 2016/0112948 A1* | 4/2016 | Liang | ..... H04W 52/0216 370/311 |
| 2018/0014347 A1* | 1/2018 | Nagasaka | ..... H04W 8/22 |
| 2019/0174449 A1* | 6/2019 | Shan | ..... H04W 60/04 |

* cited by examiner

*Primary Examiner* — Matthew W Genack

(57) ABSTRACT

A method of operating a terminal in a wireless communication system includes receiving, from a base station, system information including information on a first discontinuous reception (DRX) cycle; transmitting, to an access and mobility management function (AMF), a request message including information on a second DRX cycle based on the first DRX cycle; receiving, from the AMF, a response message about the request message, wherein the response message includes information determined based on whether the AMF assigns the second DRX cycle; and determining a DRX cycle of the terminal based on the response message.

14 Claims, 10 Drawing Sheets

METHOD AND APPARATUS FOR SETTING DISCONTINUOUS RECEPTION VALUE IN WIRELESS COMMUNICATION SYSTEM

CROSS-REFERENCE TO RELATED APPLICATION

This application is based on and claims priority under 35 U.S.C. § 119 to Korean Patent Application No. 10-2019-0036206, filed on Mar. 28, 2019, in the Korean Intellectual Property Office, the disclosure of which is incorporated by reference herein in its entirety.

BACKGROUND

1. Field

The disclosure relates to a method and apparatus for setting a discontinuous reception (DRX) value in a wireless communication system.

2. Description of Related Art

To meet the demand with respect to ever-increasing wireless data traffic after the commercialization of the $4^{th}$ generation (4G) communication system, there have been efforts to develop an advanced $5^{th}$ generation (5G) or pre-5G communication system. For this reason, the 5G or pre-5G communication system is also called a beyond 4G network communication system or post long term evolution (LTE) system. Implementation of the 5G communication system using ultra-frequency millimeter wave (mmWave) bands, e.g., 60 giga hertz (GHz) bands, is considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) modulation (FQAM), and sliding window superposition coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as things send, receive and process information without human intervention. Internet of Everything (IoE) technologies combined with the IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things are being studied. Such an IoT environment may provide intelligent Internet Technology (IT) services that create a new value for human life by collecting and analyzing data generated among connected things. IoT may be applied to a variety of areas, such as smart homes, smart buildings, smart cities, smart cars or connected cars, smart grid, health care, smart home appliances and advanced medical services through convergence and combination between existing Information Technologies (IT) and various industrial applications.

In this regard, various attempts to apply the 5G communication system to the IoT network are being made. For example, technologies regarding a sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

As described above, with the development of mobile communication systems, a method of efficiently transmitting and receiving data is required.

SUMMARY

The disclosure provides a method and apparatus for setting a long discontinuous reception (DRX) cycle value in a user equipment (UE) in a radio resource control (RRC) inactive state in a next generation mobile communication system.

Additional aspects will be set forth in part in the description which follows and, in part, will be apparent from the description, or may be learned by practice of the presented embodiments of the disclosure.

According to an embodiment of the disclosure, a method of operating a terminal in a wireless communication system includes: receiving, from a base station, system information including information on a first discontinuous reception (DRX) cycle; transmitting, to an access and mobility management function (AMF), a request message including information on a second DRX cycle based on the first DRX cycle; receiving, from the AMF, a response message about the request message, wherein the response message includes information determined based on whether the AMF assigns the second DRX cycle; and determining a DRX cycle of the terminal based on the response message.

According to an embodiment of the disclosure, a terminal in a wireless communication system includes: a transceiver; and at least one processor configured to: control the transceiver to receive, from a base station, system information including information on a first discontinuous reception (DRX) cycle; control the transceiver to transmit, to an access and mobility management function (AMF), a request message including information on a second DRX cycle based on the first DRX cycle; control the transceiver to receive, from the AMF, a response message about the request message, wherein the response message includes information determined based on whether the AMF assigns the second DRX cycle, and determine a DRX cycle of the terminal based on the response message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
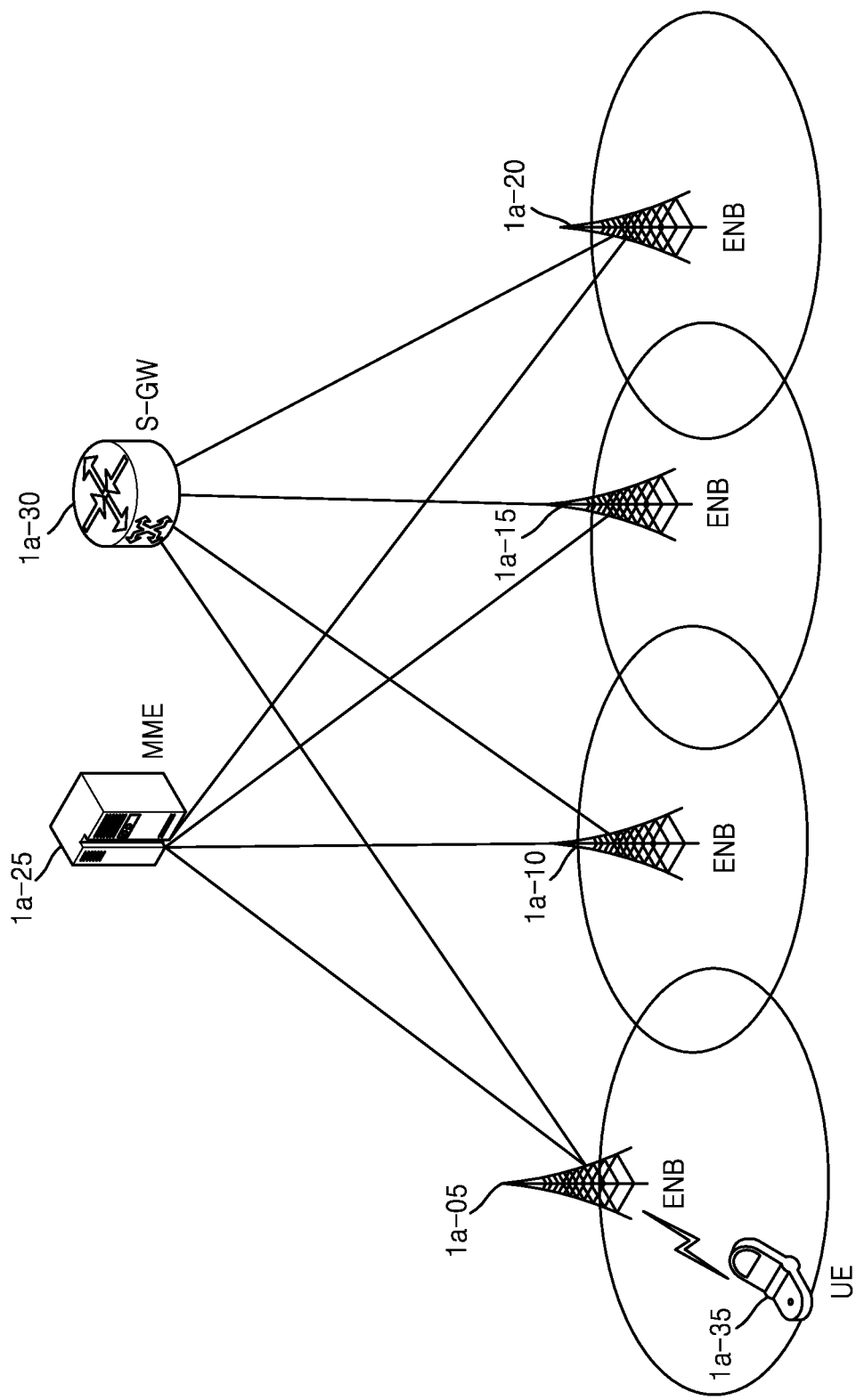
FIG. 1A shows a structure of a long term evolution (LTE) system, according to an embodiment of the disclosure.

FIGS. 1A through 1K, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

A terminal may include a user equipment (UE), a mobile station (MS), a cellular phone, a smart phone, a computer, or a multimedia system capable of communication.

In the disclosure, a controller may also be referred to as a processor.

In the disclosure, a layer (or layer apparatus) may also be referred to as an entity.

Embodiments of the disclosure will now be described in detail with reference to the accompanying drawings. Detailed descriptions of related well-known functions or features, which might obscure the gist of the disclosure, will be omitted in describing the following embodiments of the disclosure. Further, the terms as will be mentioned later, are defined by taking functionalities as will be described in the disclosure into account, but may vary depending on certain practices or intentions of users or operators. Accordingly, the terms should be defined based on the descriptions throughout this specification.

Advantages, features and methods for achieving them will be understood more clearly when the following embodiments of the disclosure are read with reference to the accompanying drawings. The embodiments of the disclosure may, however, be embodied in many different forms and should not be construed as being limited to the embodiments of the disclosure set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It will be understood that each block and combination of blocks of a flowchart may be performed by computer program instructions. The computer program instructions may be loaded on a processor of a universal computer, a special-purpose computer, or other programmable data processing equipment, and thus they generate means for performing functions, described in block(s) of flowcharts, when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions, described in block(s) of flowcharts. The computer program instructions may also be loaded on computers or programmable data processing equipment, so it is possible for the instructions to generate a process executed by the computer or the other programmable data processing equipment to provide operations for performing functions, described in block(s) of flowcharts.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a fewer number of components and modules, or further divided into a greater number of components and modules. Moreover, the components and modules may be implemented to execute one or more central processing units (CPUs) in a device or security multimedia card. In some embodiments, the module may include one or more processors.

Detailed description of related well-known functions or features, which might obscure the gist of the disclosure, will be omitted in describing the following embodiments of the disclosure. Embodiments of the disclosure will now be described with reference to accompanying drawings.

In the following description, terms used to identify an access node in use, terms to refer to network entities, terms to refer to messages, terms to refer to interfaces between network entities, terms to refer to various types of identification information, etc., are taken as examples for convenience of explanation. That is, the disclosure is not limited to the terms as will be used throughout the specification, but may use different terms having the same meaning in a technological sense.

For convenience of explanation, some of the terms and names defined by the 3$^{rd}$ generation partnership project long term evolution (3GPP LTE) will be used hereinafter. The disclosure is not, however, limited to the terms and definitions, and may be equally applied to any systems that conform to other standards. In the disclosure, an evolved node B, eNB may be interchangeably used with a next generation node B, gNB. That is, a base station (BS) termed an eNB may refer to a gNB. Furthermore, the term 'terminal' may refer to a mobile phone, a narrowband Internet of Things (NB-IoT) device, a sensor, or other wireless communication devices.

In the following description, a BS is an entity for performing resource allocation for the terminal, and may be at least one of a gNB, an eNB, a Node B, a radio access unit, a base station controller, or a network node. A terminal may include a UE, an MS, a cellular phone, a smart phone, a computer, or a multimedia system capable of communication. It is, of course, not limited thereto.

In the disclosure, a method and apparatus for setting a long discontinuous reception (DRX) cycle value in UE in a radio resource control (RRC) inactive (RRC_inactive) state in a next generation mobile communication system.

FIG. 1A shows a structure of an LTE system, according to an embodiment of the disclosure.

Referring to FIG. 1A, a radio access network of an LTE system may include eNBs (or Node Bs or base stations (BSs)) 1a-05, 1a-10, 1a-15, and 1a-20, a mobility management entity (MME) 1a-25, and a serving gateway (S-GW) 1a-30. A UE or a terminal 1a-35 may access an external network via the eNB 1a-05, 1a-10, 1a-15, or 1a-20, and the S-GW 1a-30.

In FIG. 1A, the eNBs 1a-05 to 1a-20 may correspond to the existing node Bs in a universal mobile telecommunication system (UMTS). The eNB may be wirelessly connected to the UE 1a-35 and may play a more complicated role than the existing node B. In the LTE system, all user traffic including real time services such as voice over Internet protocol (VoIP) services through an Internet protocol is served on a shared channel, so a device for collecting state information, such as buffer states, available transmit power states, channel states, etc., of UEs for scheduling is used, and the eNBs 1a-05 to 1a-20 may serve as the device. A single eNB may generally control multiple cells. For example, to attain 100 Mbps transfer speed, the LTE system uses, for example, orthogonal frequency division multiplexing (OFDM) as a radio access technology in 20 MHz bandwidth. Furthermore, an adaptive modulation and coding (AMC) that determines a modulation scheme and channel coding rate according to the channel state of the UE may be used. The S-GW 1a-30 is a device for providing a data bearer, generating or removing the data bearer under the control of the MME 1a-25. The MME 1a-25 is a device for performing various control functions as well as mobility management functions over the terminal and is connected to multiple BSs.

Figure 1B:
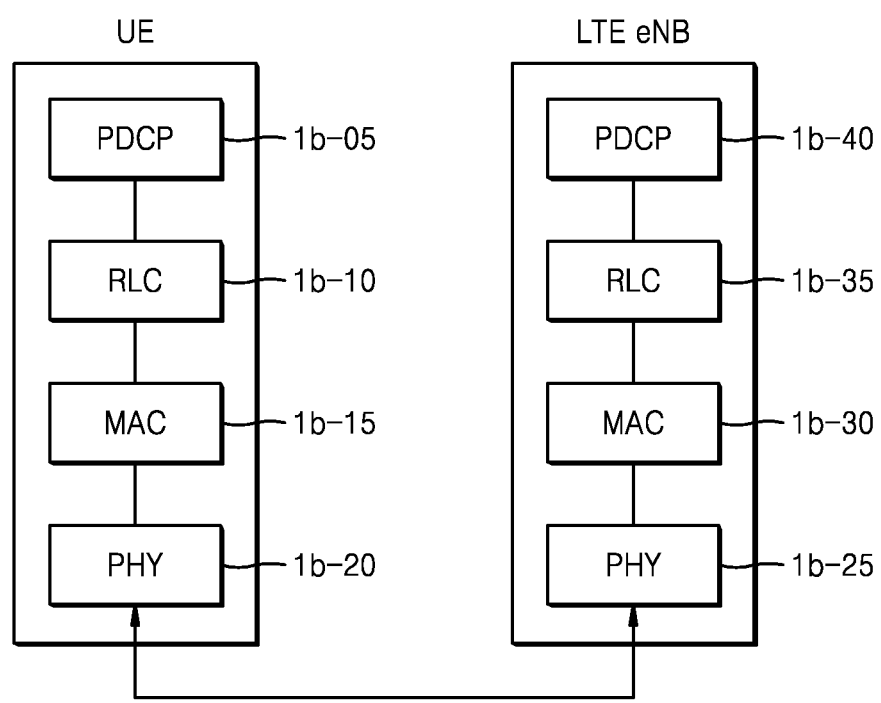
FIG. 1B shows a radio protocol architecture of an LTE system, according to an embodiment of the disclosure.

FIG. 1B shows a radio protocol architecture of an LTE system, according to an embodiment of the disclosure.

Referring to FIG. 1B, a radio protocol of an LTE system includes in each of UE and a BS or LTE eNB, a packet data convergence protocol (PDCP) layer 1b-05 and 1b-40, a radio link control (RLC) layer 1b-10 and 1b-35, a medium access control (MAC) layer 1b-15 and 1b-30, and a physical (PHY) layer 1b-20 or 1b-25. The PDCP layer 1b-05 and 1b-40 may be responsible for operation of e.g., IP header compression/decompression. Main functions of the PDCP layer may be summarized as follows:

header compression and decompression function (e.g., header compression and decompression: robust header compression (ROHC) only)

user data transfer function sequential delivery function (e.g., in-sequence delivery of upper layer Packet Data Units (PDUs) at PDCP re-establishment procedure for RLC acknowledged mode (AM))

reordering function (e.g., for split bearers in DC (only support for RLC AM): PDCP PDU routing for transmission and PDCP PDU reordering for reception)

duplicate detection function (e.g., duplicate detection of lower layer SDUs at PDCP re-establishment procedure for RLC AM)

retransmission function (e.g., retransmission of PDCP SDUs at handover and, for split bearers in DC, of PDCP PDUs at PDCP data-recovery procedure, for RLC AM)

ciphering and deciphering function timer-based SDU discard function (e.g., timer-based SDU discard in uplink)

The RLC layer 1b-10 and 1b-35 may reconstruct a PDCP packet data unit (PDU) into a suitable size to perform e.g., an automatic repeat request (ARQ) operation. Main functions of the RLC layer may be summarized as follows:

data transfer function (e.g., transfer of upper layer PDUs)

ARQ function (e.g., Error Correction through ARQ (only for AM data transfer))

concatenation, segmentation, and reassembling function (e.g., concatenation, segmentation and reassembly of RLC SDUs (only for UM and AM data transfer))

re-segmentation function (e.g., re-segmentation of RLC data PDUs (only for AM data transfer))

reordering function (e.g., reordering of RLC data PDUs (only for UM and AM data transfer))

duplicate detection function (e.g., duplicate detection (only for UM and AM data transfer))

error detection function (e.g., protocol error detection (only for AM data transfer))

RLC SDU discard function (e.g., RLC SDU discard (only for UM and AM data transfer))

RLC re-establishment function

The MAC layer 1b-15 and 1b-30 is connected to various RLC layer devices configured in a terminal, and multiplexes RLC PDUs to an MAC PDU and demultiplexes an MAC PDU to RLC PDUs. Main functions of the MAC layer may be summarized as follows:

mapping function (e.g., mapping between logical channels and transport channels)

multiplexing and demultiplexing function (e.g., multiplexing/demultiplexing of MAC SDUs belonging to one or different logical channels into/from transport blocks (TB) delivered to/from the physical layer on transport channels)

scheduling information report function

HARQ function (e.g., error correction through HARQ)

logical channel priority control function (e.g., priority handling between logical channels of one UE)

UE priority control function (e.g., priority handling between UEs by means of dynamic scheduling)

MBMS service identification function transport format selection function padding function The physical (PHY) layer 1b-20 and 1b-25 may perform channel coding and modulation on upper layer data into OFDM symbols to be transmitted on a radio channel, or perform demodulation and channel decoding on an OFDM symbol received on a radio channel and convey the result to an upper layer.

Figure 1C:
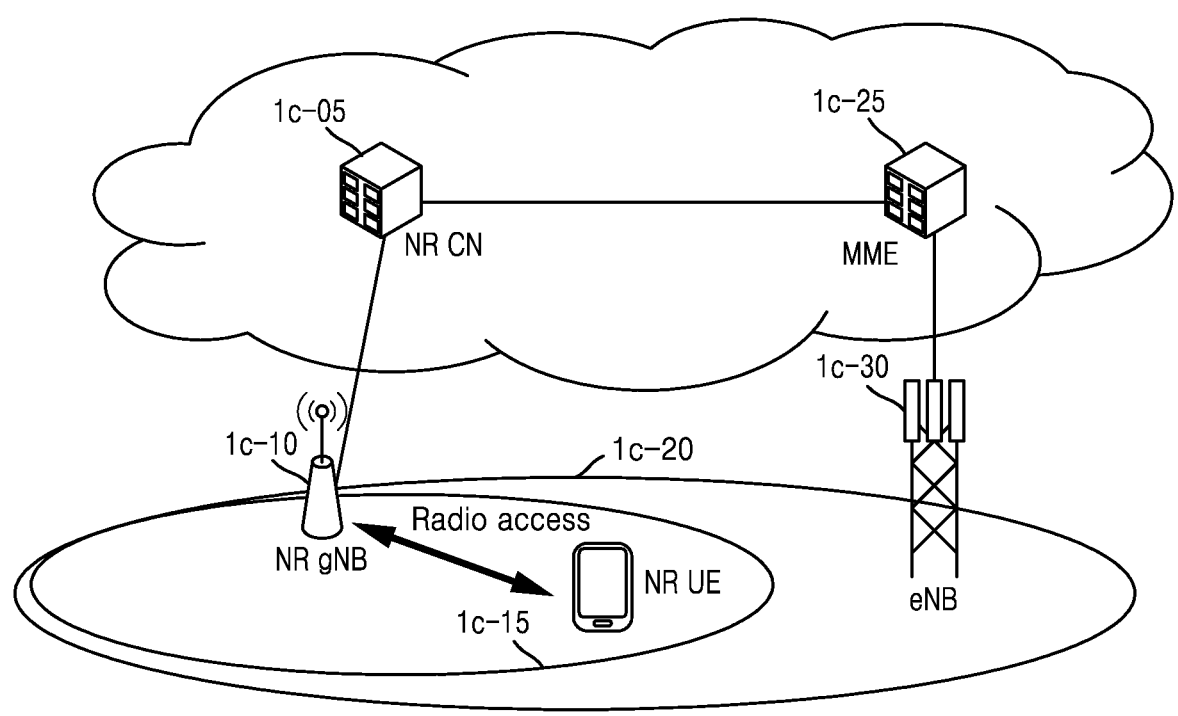
FIG. 1C shows a structure of a next generation mobile communication (NR) system, according to an embodiment of the disclosure.

FIG. 1C shows a structure of a next generation mobile communication system, according to an embodiment of the disclosure.

Referring to FIG. 1C, a radio access network of the next generation mobile communication (hereinafter, NR or 5G) system includes an NR node B (hereinafter, NR gNB or NR BS) 1c-10, and an NR core network (CN) 1c-05. A new radio user equipment (NR UE or terminal) 1c-15 accesses an external network through the NR gNB 1c-10 and the NR CN 1c-05.

In FIG. 1C, the NR gNB 1c-10 may correspond to an eNB 1c-30 of the existing LTE system 1c-20. The NR gNB 1c-10 may be connected to the NR UE 1c-15 on a radio channel, and may provide much better services than the existing node B does. In the NR system, all user traffic is served on a shared channel, so a device for collecting state information, such as buffer states, available transmit power states, channel states, etc., of UEs for scheduling is used, and the NR NB 1c-10 may serve as the device. An NR gNB may generally control a number of cells. To attain ultrahigh speed data transfer as compared to LTE, more than the existing maximum bandwidth is required, and an additional beamforming technology may be integrated with the OFDM radio access technology.

Furthermore, an adaptive modulation and coding (AMC) that determines a modulation scheme and channel coding rate according to a channel state of the UE may be used. The NR CN 1c-05 may perform functions, such as mobility support, bearer configuration, and quality of service (QoS) configuration, etc. The NR CN 1c-05 is a device responsible for various control functions as well as mobility management functions over the UE and is connected to a number of BSs. Furthermore, the NR system may work with the existing LTE system, in which case the NR CN 1c-05 may be connected to an MME 1c-25 through a network interface. The MME 1c-25 is connected to an existing BS, eNB 1c-30.

Figure 1D:
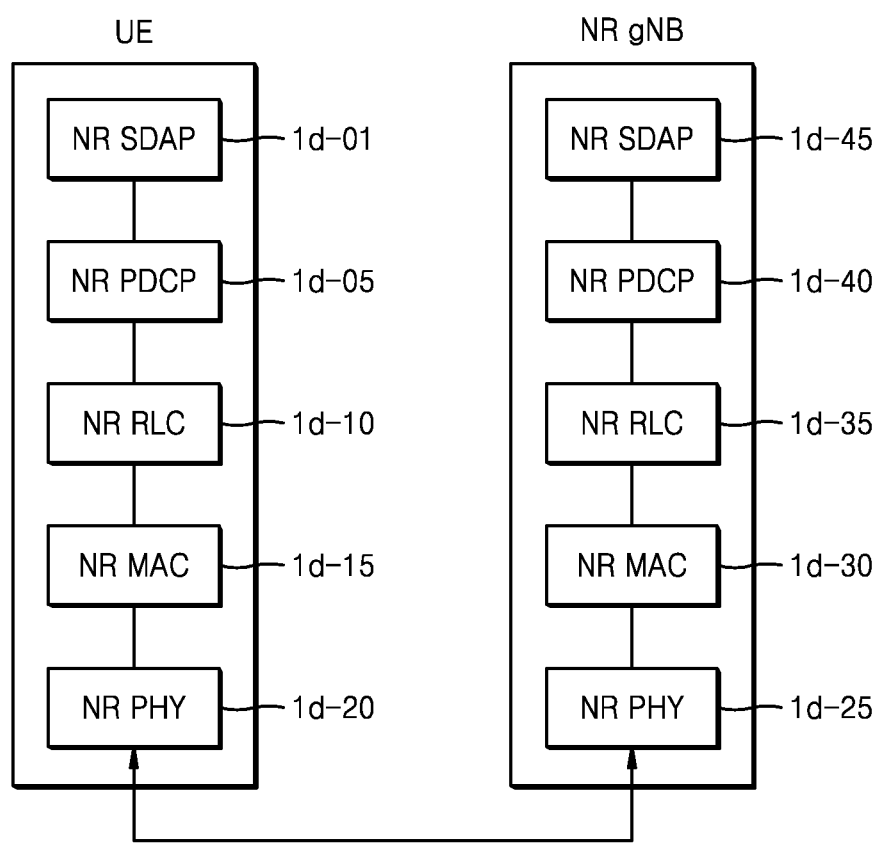
FIG. 1D shows a radio protocol architecture of an NR system, according to an embodiment of the disclosure.

FIG. 1D shows a radio protocol architecture of an NR system, according to an embodiment of the disclosure.

Referring to FIG. 1D, a radio protocol of the NR system includes in each of UE and NR gNB an NR SDAP layer 1d-01 and 1d-45, an NR PDCP layer 1d-05 and 1d-40, an NR RLC layer 1d-10 and 1d-35, an NR MAC layer 1d-15 and 1d-30, and a PHY layer 1d-20 and 1d-25.

Main functions of the NR SDAP layer 1d-01 and 1d-45 may include some of the following functions:

user plane data transfer function function of mapping between a QoS flow and a data bearer (DRB) for both downlink (DL) and uplink (UL)

function of marking QoS flow ID for both UL and DL function of mapping of a reflective QoS flow to a DRB for UL SDAP PDUs For an SDAP layer device, the UE may receive configuration of whether to use a header of the SDAP layer device or whether to use a function of the SADP layer device for each PDCP layer device, each bearer or each logical channel in a radio resource control (RRC) message. When the SDAP header is configured, a 1-bit non-access stratum (NAS) reflective QoS (NAS reflective QoS) indicator and a 1-bit access stratum (AS) reflective QoS (AS reflective QoS) indicator may indicate for the UE to update or reconfigure the mapping information between the QoS flow and the data bearer for UL or DL. The SDAP header may include QoS flow ID information indicating QoS. The QoS flow ID information may be used for data process priority, scheduling, etc., for smoother services.

Main functions of the NR PDCP layer 1d-05 and 1d-40 may include some of the following functions:

header compression and decompression function (e.g., header compression and decompression: ROHC only)

user data transfer function sequential delivery function (e.g., in-sequence delivery of upper layer PDUs)

non-sequential delivery function (e.g., out-of-sequence delivery of upper layer PDUs)

reordering function (e.g., PDCP PDU reordering for reception)

duplicate detection function (e.g., duplicate detection of lower layer SDUs)

retransmission function (e.g., retransmission of PDCP SDUs)

ciphering and deciphering function timer-based SDU discard function (e.g., timer-based SDU discard in uplink)

Of the aforementioned functions, the reordering function of the NR PDCP device may refer to a function of reordering PDCP PDUs received from a lower layer based on PDCP sequence numbers (SNs). The reordering function of the NR PDCP device may include a function of delivering data to an upper layer in the reordered sequence. Alternatively, the reordering function of the NR PDCP device may include delivering the data directly to the upper layer without considering the sequence. Moreover, the reordering function of the NR PDCP device may include a function of reordering the sequence to record missing PDCP PDUs, a function of reporting status of missing PDCP PDUs to a transmitting end, or a function of requesting retransmission of missing PDCP PDUs.

Main functions of the NR RLC layer $1d$-10 and $1d$-35 may include some of the following functions:

data transfer function (e.g., transfer of upper layer PDUs)

sequential delivery function (e.g., in-sequence delivery of upper layer PDUs)

non-sequential delivery function (e.g., out-of-sequence delivery of upper layer PDUs)

ARQ function (e.g., error correction through ARQ)

concatenation, segmentation, and reassembling function (e.g., concatenation, segmentation and reassembly of RLC SDUs)

re-segmentation function (e.g., re-segmentation of RLC data PDUs)

reordering function (e.g., reordering of RLC data PDUs)

duplicate detection function error detection function (e.g., protocol error detection)

RLC SDU discard function

RLC re-establishment function

The sequential delivery function of the NR RLC device may refer to a function of delivering RLC SDUs received from a lower layer to an upper layer in sequence. The sequential delivery function of the NR RLC device may include a function of receiving, reassembling and delivering multiple RLC SDUs resulting from segmentation of an original RLC SDU, a function of reordering the received RLC PDUs based on RLC SNs or PDCP SNs, a function of reordering the sequence to record missing RLC PDUs, a function of reporting status of missing RLC PDUs to a transmitting end, a function of requesting retransmission of missing PDCP PDUs, when there is a missing RLC SUD, a function of delivering RLC SDUs before the missing RLC SDU to an upper layer in sequence, when there is a missing RLC SDU but a timer is expired, a function of delivering all RLC SDUs received before the timer starts to an upper layer in sequence, and when there is a missing RLC SDU but a timer is expired, a function of delivering all RLC SDUs received up to the present to an upper layer in sequence.

Furthermore, the sequential delivery function of the NR RLC device may deliver RLC PDUs to a PDCP device regardless of the sequence (out-of-sequence delivery) by processing the RLC PDUs in the order of reception (or in the order of arrival without regard to the order of the SNs), or when the RLC PDU is segmented, reassemble the segments stored in a buffer or received into a complete RLC PDU, process and deliver the RLC PDU to a PDCP device. The NR RLC layer may not include the concatenation function, and the concatenation function may be performed in the NR MAC layer or replaced with a multiplexing function in the NR MAC layer.

The non-sequential delivery function of the NR RLC device may refer to a function of delivering RLC SDUs received from a lower layer directly to an upper layer without regard to the sequence of the RLC SDUs. The non-sequential delivery function of the NR RLC device may include a function of receiving, reassembling and delivering multiple RLC SDUs resulting from segmentation of an original RLC SDU, and a function of storing RLC SNs or PDCP SNs of the received RLC PDUs and reordering the received RLC PDUs to record missing RLC PDUs.

The NR MAC layer $1d$-15 and $1d$-30 may be connected to multiple NR RLC layer devices configured in the same UE, and main functions of the NR MAC layer $1d$-15 and $1d$-30 may include some of the following functions:

mapping function (e.g., mapping between logical channels and transport channels)

multiplexing and demultiplexing function (e.g., multiplexing/demultiplexing of MAC SDUs)

scheduling information report function

HARQ function (e.g., error correction through HARQ)

logical channel priority control function (e.g., priority handling between logical channels of one UE)

UE priority control function (e.g., priority handling between UEs by means of dynamic scheduling)

MBMS service identification function transport format selection function padding function The NR PHY layer $1d$-20 and $1d$-25 may perform channel coding and modulation on upper layer data into OFDM symbols to be transmitted on a radio channel, or perform demodulation and channel decoding on an OFDM symbol received on a radio channel and deliver the result to an upper layer.

Figure 1E:
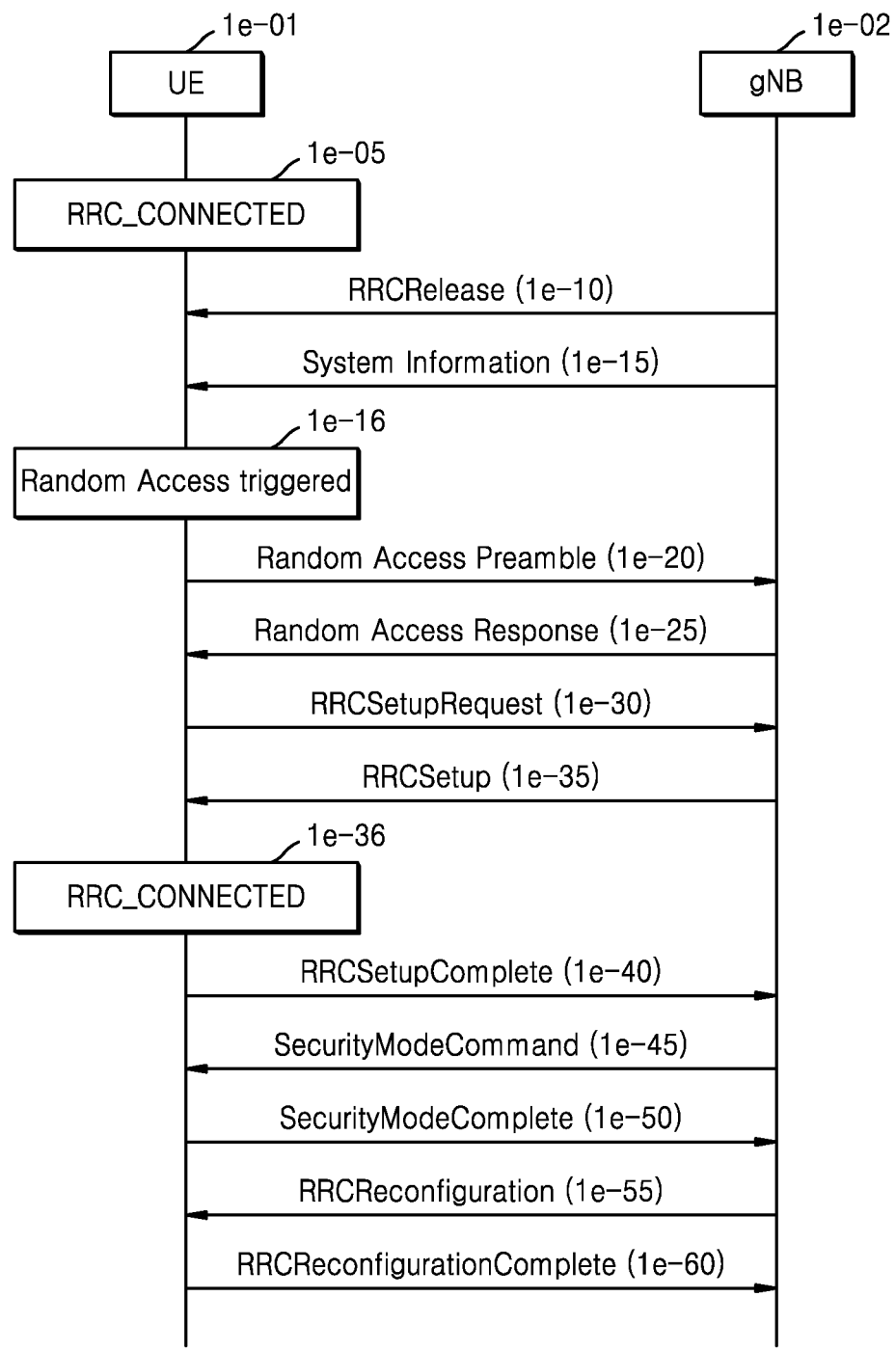
FIG. 1E shows a procedure in which a base station releases connection to a user equipment (UE) and the UE switches into a radio resource control (RRC) idle (RRC_idle) mode from an RRC connected (RRC_connected) mode, and a procedure in which the UE establishes a connection with the base station and switches into the RRC_connected mode from the RRC_idle mode, according to an embodiment of the disclosure.

FIG. 1E shows a procedure in which a BS releases connection to UE and the UE switches into a radio resource control (RRC) idle (RRC_idle) mode from an RRC connected (RRC_connected) mode, and a procedure in which the UE establishes a connection with the BS and switches into the RRC_connected mode from the RRC_idle mode, according to an embodiment of the disclosure.

Referring to FIG. 1E, a UE $1e$-01, may be in the RRC_connected mode after establishing an RRC connection with a BS, i.e., gNB $1e$-02, in operation $1e$-05. When the UE $1e$-01 has not transmitted or received data for some reason or for a certain period of time in the RRC_connected mode, the gNB $1e$-02 may make the UE $1e$-01 switch into the RRC_idle mode by transmitting an RRC connection release message (RRCRelease message) that includes no suspend configuration information (suspendConfig or rrc-Inactive-Config) to the UE $1e$-01, in operation $1e$-10. In the RRC_idle mode, the UE $1e$-01 may search for and camp on a suitable cell through a cell selection procedure and/or a cell re-selection procedure and receive system information, in operation $1e$-15.

The UE $1e$-01 may perform a random access procedure to establish an RRC connection with the gNB $1e$-02. When the random access is triggered in operation $1e$-16, the UE $1e$-01 may select a physical random access channel (PRACH) occasion to transmit a random access preamble to the gNB $1e$-02 in operation $1e$-20. When receiving the random access preamble, the gNB $1e$-02 may transmit a random access response (RAR) message to the UE $1e$-01 in response, in operation 1e-25. The UE 1e-01 in the RRC_idle mode may set up reverse synchronization with the gNB 1e-02 in operations 1e-20 and 1e-25.

After setting up the reverse synchronization, the UE 1e-01 in the RRC_idle mode may perform an RRC connection establishment procedure with the gNB 1e-02. First, the UE 1e-01 may transmit an RRC connection setup request message (RRCSetupRequest message) to the gNB 1e-02, in operation 1e-30. The message may include a UE identifier (ue-Identity) and a cause (establishmentCause) of why the UE is going to establish the RRC connection. Upon reception of the RRC connection setup request message, the gNB 1e-02 may transmit an RRC connection setup message (RRCSetup message) to the Ue 1e-01, in operation 1e-35. The RRC connection setup message, RRCSetup message, may include e.g., radio bearer configuration information (radioBearerConfig) and master cell group configuration information (masterCellGroup). Specifically, the radio bearer configuration information and the master cell group configuration information may include information involving a signaling radio bearer1 (SRB1) connection, RLC bearer configuration information for SRB1, MAC cell group configuration information (mac-CellGroupConfig), physical cell group configuration information (physicalCellGroupConfig), etc. The RRC connection establishment may involve SRB1 connection without involving other radio bearer connection except SRB1 (for example, the RRC connection establishment may not involve SRB2 connection for transmitting or receiving an NAS message or data radio bearer (DRB) connection for transmitting or receiving data between the UE 1e-01 and the gNB 1e-02). When receiving the RRC connection setup message, the UE 1e-01 may apply the aforementioned information and switch into the RRC_connected mode, in operation 1e-36. After switching into the RRC_connected mode, the UE 1e-01 may transmit an RRC connection setup complete message (RRCSetupComplete message) to the gNB 1e-02 in SRB1, in operation 1e-40. The RRC connection setup complete message may include a service request message in which the UE 1e-01 requests an AMF or the MMF for bearer setup for a certain service.

When the RRC connection establishment procedure is successfully performed, the gNB 1e-02 may transmit a security mode command message (SecurityModeCommand message) to the UE 1e-01 to activate AS security with the UE 1e-01 that is in the RRC_connected mode, in operation 1e-45. When receiving the security mode command message, the UE 1e-01 may transmit a security mode complete message (SecurityModeComplete message) to the gNB 1e-02, in operation 1e-50.

The gNB 1e-02 may perform an RRC connection reconfiguration (RRC reconfiguration) procedure with the UE 1e-01 when or after transmitting the security mode command message or after receiving the security mode complete message. First, the gNB 1e-02 may transmit an RRC connection reconfiguration message (RRCReconfiguration message) to the UE 1e-01, in operation 1e-55. The RRC connection reconfiguration message may include configuration information of the DRB to process user data and configuration information of SRB2 to transmit an NAS message. When receiving the RRC connection reconfiguration message, the UE 1e-01 may transmit an RRC connection reconfiguration complete message (RRCReconfigurationComplete message) to the gNB 1e-02, in operation 1e-60.

As described above, in order for the UE to establish an RRC connection and switch into the RRC_connected mode from the RRC_idle mode, a lot of signaling processes are used. Hence, in the NR system, an RRC inactive mode (RRC_inactive) may be newly defined. In the new mode, the UE and the gNB store a context of the UE, so when the UE in the RRC_inactive mode tries to re-access the network, an RRC connection resume procedure as will be described below may allow more speedy access and data transmission or reception with less signaling processes.

Figure 1F:
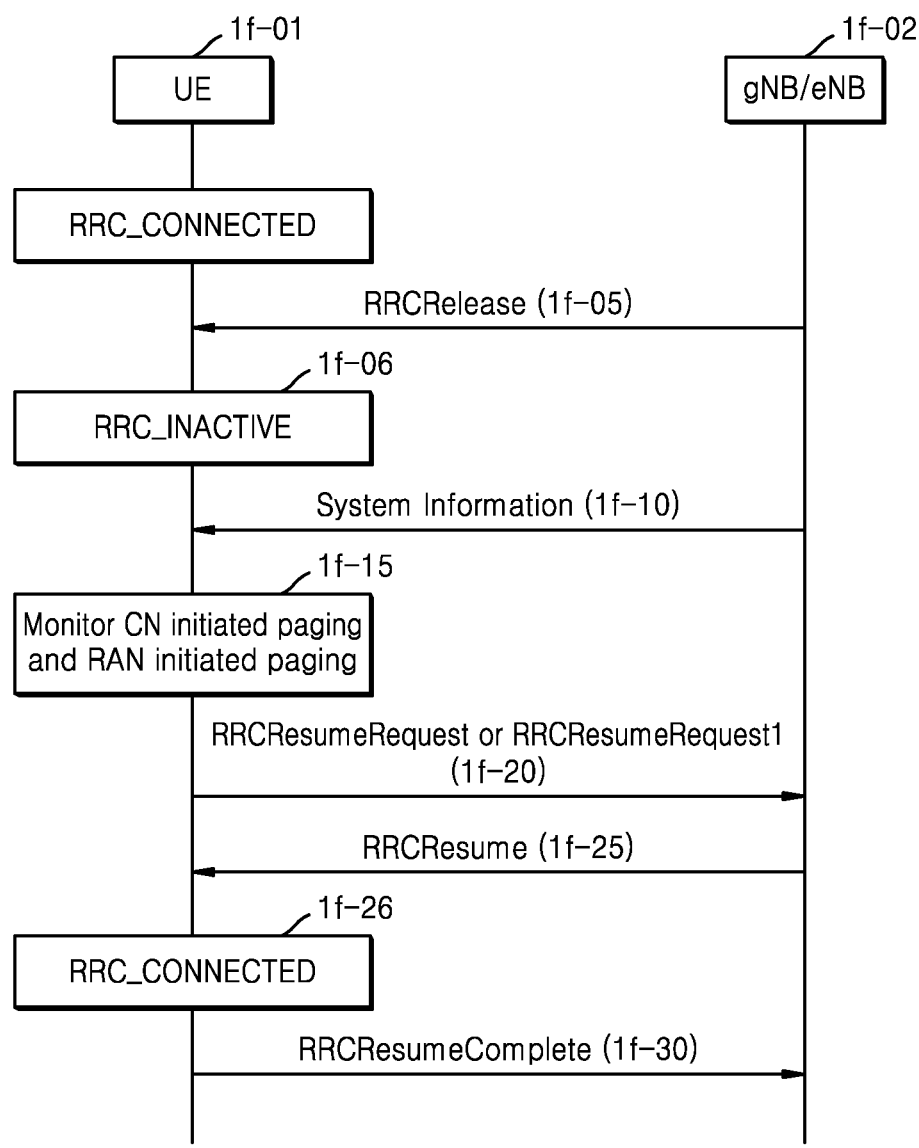
FIG. 1F shows a procedure in which a base station releases connection to a UE and the UE switches into an RRC inactive (RRC_inactive) mode from an RRC_connected mode, and a procedure in which the UE resumes connection with the base station and switches into the RRC_connected mode from the RRC_inactive mode, according to an embodiment of the disclosure.

FIG. 1F shows a procedure in which a BS releases connection to UE and the UE switches into an RRC inactive (RRC_inactive) mode from an RRC_connected mode, and a procedure in which the UE resumes connection with the BS and switches into the RRC_connected mode from the RRC_inactive mode, according to an embodiment of the disclosure.

Referring to FIG. 1F, a UE 1f-01 may be in the RRC_connected mode after establishing an RRC connection with a BS, i.e., gNB 1f-02. When the UE 1f-01 has not transmitted or received data for some reason or for a certain period of time in the RRC_connected mode, the gNB 1f-02 may transmit an RRC connection release message (RRCRelease message) that includes suspend configuration information (suspendConfig) to the UE 1f-01 in operation 1f-05, so that the UE 1f-01 may switch into the RRC_inactive mode in operation 1f-06.

When the UE 1f-01 receives the RRC connection release message that includes the suspend configuration information from the gNB 1f-02, a series of operations of the UE 1f-01 proposed in the embodiment of the disclosure will be as follows:

- the UE may apply the received suspend configuration information (suspendConfig). The suspend configuration information may include the following parameters:
- full UE connection resume identifier (fullI-RNTI): when useFullResumeID is signaled in system information block type 1 (SIB1) broadcast in a cell to which the UE intends later to resume connection through a cell selection/reselection procedure, the UE may transmit an RRCResumeRequest1 message to the cell. For example, the UE may set resumeIdentity to an I-RNTI value and transmit the RRCResumeRequest1 message to the cell. The corresponding field is included in the suspend configuration information all the time.
- short UE connection resume identifier (Short1-RNTI): when useFullResumeID is not signaled in the SIB1 broadcast in a cell to which the UE intends later to resume connection through a cell selection/reselection procedure, the UE may transmit an RRCResumeRequest1 message to the cell. For example, the UE may set resumeIdentity to a Short1-RNTI value and transmit the RRCResumeRequest message to the cell. The corresponding field is included in the suspend configuration information all the time.
- ran paging cycle (ran-PagingCyle): the UE in the RRC_inactive mode may monitor RAN-initiated paging by applying a value included in the ran-PagingCycle field. Upon reception of the RAN-initiated paging, the UE may perform the RRC connection resume procedure with the gNB. A ran-PagingCycle may have a value of one of {rf32, rf64, rf128, and rf256}, where rf32 indicates 32 radio frame length. That is, rf32 means 320 ms. The corresponding field is included in the suspend configuration information all the time.
- ran paging cycle (ran-PagingCyle): the UE in the RRC_inactive mode may monitor RAN-initiated paging by applying a value included in the ran-PagingCycle2 field. Upon reception of the RAN-initiated paging, the UE may perform the RRC connection resume procedure with the gNB. A ran-PagingCycle2 may have a value of one of {rf512, and rf1024}, where rf512 indicates 512 radio frame length. That is, rf512 means 5120 ms. The corresponding field may also be included in the suspend configuration information along with the ran-Paging Cycle in order for the gNB to allow the UE in the RRC_inactive mode to apply a longer DRX mode.

RAN based notification area information (ran-NotificationAreaInfo): the UE in the RRC_inactive mode may perform a RAN based notification area update (RNA update or RNAU) procedure with the corresponding cell or the gNB when getting out of a RAN based notification area (RNA) after SIB1 reception.

t380: PeridocRNAU-TimerValue may be included for the UE in the RRC_inactive mode to periodically perform the RNAU procedure. With the PeridocRNAU-TimerValue included, the UE may set a timer T380 to have the timer value and start the timer T380. When the timer is expired, the UE may perform the RNAU procedure with the BS.

nextHopChaingCount: the UE in the RRC_inactive mode may update a security key (KgNB key) and associated parameters using NextHopChainingCount. The corresponding field is included in the suspend configuration information all the time.

the UE may reset the MAC layer device. This is to prevent data stored in an HARQ buffer from being unnecessarily retransmitted when connection is resumed.

the UE may re-establish RLC layer devices for SRB1. This is to prevent data stored in an RLC buffer from being unnecessarily retransmitted when a connection is resumed and to initiate variables for future use.

the UE may store UE inactive AS context. The UE inactive AS context refers to the configured suspend configuration information, the current security key (KgNB key and/or KRRCint key), an ROHC state, a UE cell identifier (C-RNTI) that was used in a source PCell, a cell identity (cellIdentity) of a source cell, a physical cell identity, or other parameters configured except ReconfigurationWithSync.

the UE may suspend all SRBs and DRBs except SRB0.

the UE may indicate suspension of the PDCP to the lower layer devices for all DRBs.

when the received suspend configuration information includes t380, the UE may set a timer value to t380 and start a timer T380.

when the RRC connection release message includes waitTime, the UE may set a timer value to waitTime and start a timer T320. And the UE may notify a higher layer device that access barring is applicable for all access categories except for access categories '0' and '2'.

the UE may switch into the RRC_inactive mode in operation 1f-06 and perform a cell selection procedure.

After switching into the RRC_inactive mode, the UE 1f-01 may perform the cell selection procedure or a cell re-selection procedure, and search for and camp on a suitable cell to receive system information, in operation 1f-10.

In operation 1f-15, the UE 1f-01 in the RRC_inactive mode may monitor CN initiated paging and RAN initiated paging. When the UE 1f-01 receives the CN initiated paging, the UE 1f-01 may switch into the RRC_idle mode and notify the NAS of the reception. When the UE 1f-01 receives the RAN initiated paging, the UE 1f-01 may perform the RRC connection resume procedure with the gNB 1f-02. When the UE 1f-01 performs a random access procedure with the gNB 1f-02 and receives an RRC message from the gNB 1f-02, operations (1f-20) of the UE 1f-01 proposed in the disclosure are as follows:

1. When a useFullResumeID field is signaled in the system information (SIB1), the UE may select RRCResumeRequest1 as a message to be transmitted to the gNB. The UE may prepare to transmit the stored full-RNTI value as the resumeIdentity in the RRCResumeRequest1 message. Otherwise, the UE may select RRCResumeRequest as a message to be transmitted to the gNB. The UE may prepare to transmit the stored split UE connection resume identifier value (short1-RNTI value) as the shortResumeIdentity in the RRCResumeRequest message.

2. The UE may select a cause of resuming connection (resumeCause) to be 'mt-Access'.

3. The UE may restore RRC configuration information and security context information from the UE inactive AS context stored with the exception of cell group configuration information.

4. The UE may calculate MAC-I and prepare to transmit the last 16 bits of the MAC-I in a resumeMAC-I field of the selected message.

5. The UE newly updates the KgNB security key based on the current KgNB security key, a nexthop (NH) value, and a stored NCC value.

6. Furthermore, the UE may use the newly updated KgNB security key to derive new security keys K_RRCenc, K_RRC_int, K_UPint, and K_UPenc to be used in an integrity protection and verification procedure and an encryption and decryption procedure.

7. The UE may then resume the integrity protection and verification procedure by applying the updated security keys and previously set algorithm for all the bearers except SRB0, and apply the integrity protection and verification for data subsequently transmitted or received. This is to increase reliability and security for the subsequent data transmitted or received in SRB1 or DRBs.

8. Moreover, the UE may resume the encryption and decryption procedure by applying the updated security keys and previously set algorithm for all the bearers except SRB0, and apply the encryption and decryption for data subsequently transmitted or received. This is to increase reliability and security for the subsequent data transmitted or received in SRB1 or DRBs.

9. The UE may restore the PDCP state and re-establish PDCP entities for SRB1.

10. The UE may resume SRB1. This is to receive an RRCResume message in SRB1 in response to the RRCResumeRequset message or the RRCResumeRequest1 message for transmission.

11. The UE may configure and deliver a message selected for transmission to the gNB, i.e., the RRCResumeRequset message or the RRCResumeRequest1 message, to lower layer devices.

12. The UE may start a timer T319 when transmitting the RRCResumeRequset message or the RRCResumeRequest1 message to the gNB. When the timer T319 is expired, the UE may automatically switch into the RRC_idle mode. Furthermore, the UE may determine a DRX cycle, T, to be a shorter one of a default DRX value and a UE-specific DRX value (when assigned).

In operation 1f-25, operations of the UE 1f-01 proposed in the disclosure when the UE 1f-01 in the RRC_idle mode receives the RRC connection resume message are as follows:

1. The UE may stop running the timer T319 that has started when transmitting the RRCResumeRequset message or the RRCResumeRequest1 message to the gNB.

2. When the fullConfig information is included in the RRCResume message, the UE may perform a full configuration procedure. Otherwise, the UE may restore the PDCP state when receiving the message and reset the COUNT value for SRB2 and all the DRBs. Furthermore, the UE may restore cell group configuration information from a UE context stored. The UE may then notify the lower layer devices of the restoration.

3. The UE may release the full UE connection resume identifier (Full-RNTI), the split UE connection resume identifier (Short1-RNTI), and the stored UE context. In this case, the UE may not release the RAN notification area information (ran-NotificatioAreaInfo).

4. When the RRCResume message includes a master cell group (masterCellgroup) configuration information, a cell group configuration procedure may be performed based on the configuration information.

5. When the RRCResume message includes bearer configuration information (radioBearerConfig), the UE may configure a bearer based on the configuration information.

6. The UE may resume SRB2 and all DRBs.

7. The UE may discard cell re-selection priority information when there is the cell re-selection priority information stored. The cell re-selection priority information may be one that has been stored from CellReselectionPriorities that may be contained in the RRCRlease message or that is taken over from another RAT.

8. When the timer T320 is running, the UE may stop the timer T320.

9. When the RRCResume message includes frequency measurement configuration information (measConfig), the UE may perform frequency measurement based on the configuration information.

10. When the RRC connection is suspended, the UE may resume the frequency measurement.

11. The UE switches into the RRC_connected mode, in operation 1*f*-26.

12. The UE may notify the upper layer devices that RRC connection that has been suspended is resumed.

13. The UE may stop the cell re-selection procedure.

14. The UE may regard the currently connected cell as a primary cell (PCell).

15. The UE then configures and delivers an RRC connection resume complete (RRCResumeComplete) message to the lower layer devices in operation 1*f*-30, as follows:

A. When the upper layer devices provide an NAS PDU, the RRCResumeComplete message may include a dedicatedNAS-Message, which includes the NAS PDU.

Figure 1G:
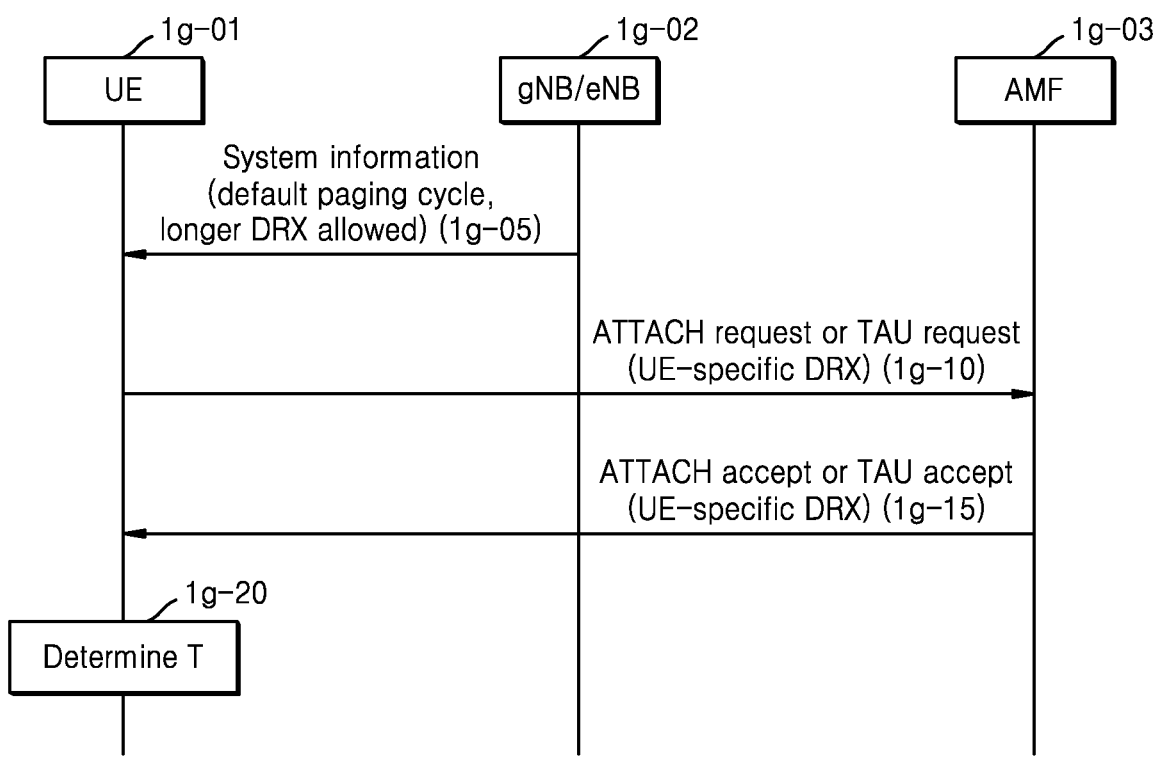
FIG. 1G shows a procedure in which a UE in an RRC_idle mode determines a discontinuous reception (DRX) cycle or a longer DRX cycle, according to an embodiment of the disclosure.

FIG. 1G shows a procedure in which UE in RRC_idle mode determines a DRX cycle or a longer DRX cycle, according to an embodiment of the disclosure.

In an embodiment of the disclosure, a DRX cycle may refer to one of {320 ms, 640 ms, 1280 ms, and 2560 ms}, and a longer DRX cycle may refer to one of {5120 ms, and 10240 ms}. For convenience of explanation, the DRX cycle or the longer DRX cycle may be called a DRX cycle T.

Referring to FIG. 1G, when a BS, i.e., gNB or eNB 1*g*-02, supports a longer DRX cycle, the BS 1*g*-02 may broadcast related DRX capability indication in system information, in operation 1*g*-05. A UE 1*g*-01 in the RRC_idle mode may receive certain system information from the BS 1*g*-02, in operation 1*g*-05. The system information may include a default paging cycle value (default DRX value). In an embodiment of the disclosure, the default paging cycle value may be included in system information block type 1 (SIB1) for NR and in system information block type 2 (SIB2) for LTE. The default paging cycle may be signaled as one of {rf32, rf64, rf128, and rf256}. rf32 indicates 32 radio frame length. That is, rf32 means 320 ms. When the UE 1*g*-01 wants a DRX cycle shorter than the default DRX value, the UE 1*g*-01 may be allocated a desired DRX cycle value (UE-specific DRX value) through an ATTACH or Tracking Area Update (TAU) procedure with an AMF 1*g*-03. In an embodiment of the disclosure, the UE 1*g*-01 may transmit the DRX wanted by the UE (UE-specific DRX value) to the AMF 1*g*-03 in an ATTACH request message or a TAU request message, in operation 1*g*-10, and when the AMF 1*g*-03 supports this, the AMF 1*g*-03 may provide an ATTACH accept message or a TAU accept message in the DRX cycle wanted by the UE 1*g*-01 (UE-specific DRX value), in operation 1*g*-15. The UE-specific DRX value may be one of {rf32, rf64, rf128, and rf256} Upon reception of the information, the UE 1*g*-01 may determine a shorter one of the default DRX value and the UE-specific DRX value to be the DRX cycle T in the RRC_idle mode, in operation 1*g*-20. When not allocated the UE-specific DRX value, the UE 1*g*-01 may determine the default DRX value to be the DRX cycle T in the RRC_idle mode, in operation 1*g*-20.

When the UE 1*g*-01 wants a DRX cycle longer than the default DRX value, the UE 1*g*-01 may be allocated a desired longer DRX cycle value (UE-specific DRX value) through an ATTACH or TAU procedure with the AMF 1*g*-03. In an embodiment of the disclosure, the UE 1*g*-01 may transmit the longer DRX wanted by the UE 1*g*-01 (UE-specific DRX value) to the AMF 1*g*-03 in the ATTACH request message or the TAU request message, in operation 1*g*-10, and when the AMF 1*g*-03 supports this, the AMF 1*g*-03 may provide the ATTACH accept message or the TAU accept message in the longer DRX cycle wanted by the UE 1*g*-01 (UE-specific DRX value), in operation 1*g*-15. The UE-specific DRX value may be one of {rf512, and rf1024}. Upon reception of the information, the UE 1*g*-01 may determine the DRX cycle T by applying the allocated UE-specific DRX value in the RRC_idle mode, in operation 1*g*-20. When not allocated the UE-specific DRX value, the UE 1*g*-01 may determine the default DRX value to be the DRX cycle T in the RRC_idle mode, in operation 1*g*-20.

Figure 1H:
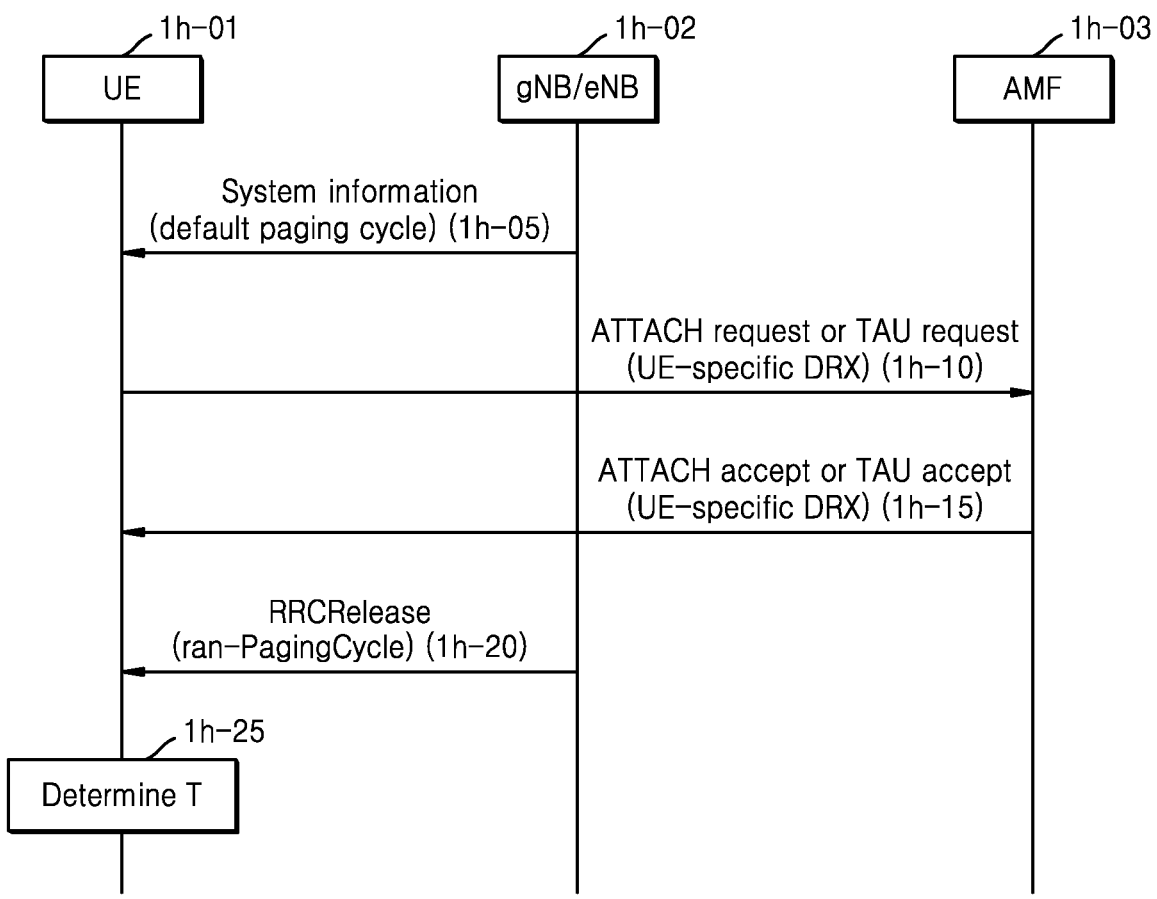
FIG. 1H shows a procedure in which a UE in an RRC_idle mode determines a DRX cycle, according to an embodiment of the disclosure.

FIG. 1H shows a procedure in which UE in an RRC_idle mode determines a DRX cycle, according to an embodiment of the disclosure.

In an embodiment of the disclosure, a DRX cycle may refer to one of {320 ms, 640 ms, 1280 ms, and 2560 ms}, and a longer DRX cycle may refer to one of {5120 ms, and 10240 ms}. For convenience of explanation, the DRX cycle or the longer DRX cycle may be called a DRX cycle T.

Referring to FIG. 1H, UE 1*h*-01 in the RRC_idle mode or RRC_inactive mode may receive certain system information from a BS, i.e., gNB/eNB 1*h*-02, in operation 1*h*-05. The system information may include a default paging cycle value (default DRX value). In an embodiment of the disclosure, the default paging cycle value may be included in SIB1 for NR and in SIB2 for LTE. The default paging cycle may be signaled as one of {rf32, rf64, rf128, and rf256}. rf32 indicates 32 radio frame length. That is, rf32 means 320 ms. When the UE 1*h*-01 wants a DRX cycle shorter than the default DRX value, the UE 1*h*-01 may be allocated a desired DRX cycle value (UE-specific DRX value) through an ATTACH or TAU procedure with an AMF 1*h*-03. In an embodiment of the disclosure, the UE 1*h*-01 may transmit the DRX wanted by the UE 1*h*-01 (UE-specific DRX value) to the AMF 1*h*-03 in an ATTACH request message or a TAU request message, in operation 1h-10, and when the AMF 1h-03 supports this, the AMF 1h-03 may provide an ATTACH accept message or a TAU accept message in the DRX cycle wanted by the UE 1h-01 (UE-specific DRX value), in operation 1h-15. The UE-specific DRX value may be one of {rf32, rf64, rf128, and rf256} The BS 1h-02 may transmit ran-PagingCycle to the UE 1h-01 in an RRC message indicating for the UE 1h-01 to switch into the RRC_inactive mode, in 1h-20. The UE 1h-01 in the RRC_inactive mode may determine the DRX cycle T to be the shortest of the default DRX value broadcast in the system information, a DRX value signaled in the ran-PagingCycle, and the UE-specific DRX value allocated from the upper layer device, in operation 1h-25. When the UE-specific DRX value is not allocated from the upper layer device, the UE 1h-01 in the RRC_inactive mode may determine the DRX cycle T to be a shorter one of the DRX value signaled in the ran-PagingCycle and the default DRX value broadcast in the system information, in operation 1h-25.

Figure 1I:
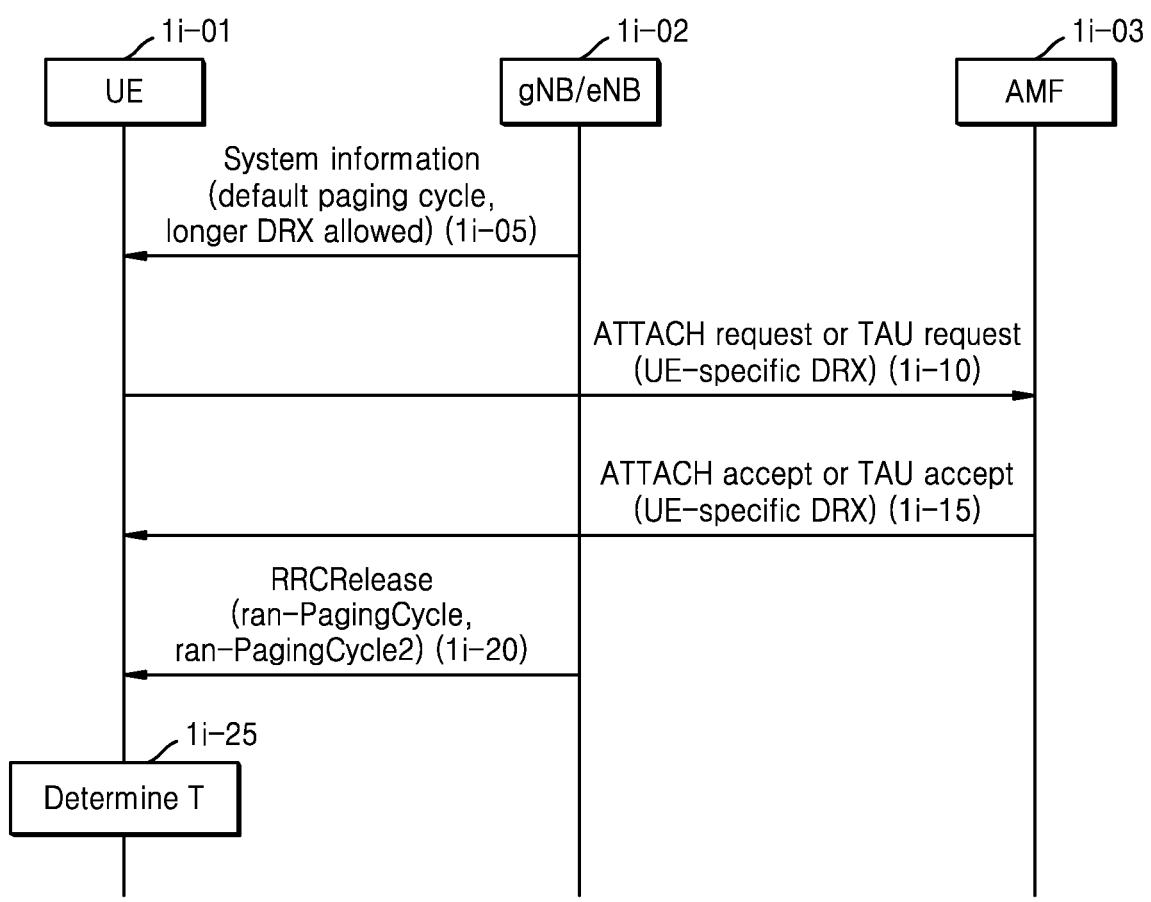
FIG. 1I shows a procedure in which a UE in an RRC_idle mode determines a DRX cycle or a longer DRX cycle, according to an embodiment of the disclosure.

FIG. 1I shows a procedure in which UE in RRC_idle mode determines a DRX cycle or a longer DRX cycle, according to an embodiment of the disclosure.

Referring to FIG. 1I, UE 1i-01 in the RRC_idle mode or RRC_inactive mode may receive certain system information from a BS, i.e., gNB/eNB 1i-02, in operation 1i-05. The system information may include a default paging cycle value (default DRX value). In an embodiment of the disclosure, the default paging cycle value may be included in SIB1 for NR and in SIB2 for LTE. The default paging cycle may be signaled as one of {rf32, rf64, rf128, and rf256}. rf32 indicates 32 radio frame length. That is, rf32 means 320 ms. When the UE 1i-01 wants a DRX cycle shorter or longer than the default DRX value, the UE 1i-01 may be allocated a desired DRX cycle value (UE-specific DRX value) through an ATTACH or TAU procedure with an AMF 1i-03. In an embodiment of the disclosure, the UE 1i-01 may transmit the DRX wanted by the UE 1i-01 (UE-specific DRX value) to the AMF 1i-03 in an ATTACH request message or a TAU request message, in operation 1i-10, and when the AMF 1i-03 supports this, the AMF 1i-03 may provide an ATTACH accept message or a TAU accept message in the DRX cycle wanted by the UE 1i-01 (UE-specific DRX value), in operation 1i-15. The UE-specific DRX value may be one of {rf32, rf64, rf128, rf256, rf512, and rf1024} The BS 1i-02 may transmit ran-PagingCycle and ran-PagingCycle2 to the UE 1i-01 in an RRC message indicating fort the UE 1i-01 to switch into the RRC_inactive mode, in 1i-20. The UE 1i-01 in the RRC_inactive mode may determine the DRX cycle T in operation 1i-25 by applying one of the following rules:

<Rule 1>
when allocated the UE-specific DRX value from the upper layer device, the UE may determine the DRX cycle T to be the shortest of a value signaled in the ran-PagingCycle2 and the UE-specific DRX value.
when not allocated the UE-specific DRX value from the upper layer device, the UE may determine the DRX cycle T to be the value signaled in the ran-PagingCycle2.

<Rule 2>
when allocated the UE-specific DRX value from the upper layer device and when the shortest of the value signaled in the ran-PagngCycle2 and the UE-specific DRX value is rf512 or rf1024, the UE may determine the DRX cycle T to be the shortest of the value signaled in the ran-PagngCycle2 and the UE-specific DRX value.

when allocated the UE-specific DRX value from the upper layer device and when the shortest of the value signaled in the ran-PagngCycle2 and the UE-specific DRX value is rf32, rf 64, rf128, or rf256, the UE may determine the DRX cycle T to be the shortest of the default DRX value broadcast in the system information, the value signaled in the ran-PagngCycle2 and the UE-specific DRX value allocated from the upper layer device.
when not allocated the UE-specific DRX value from the upper layer device, the UE may determine the DRX cycle T to be the value signaled in the ran-PagingCycle2.

<Rule 3>
the UE may determine the DRX cycle T to always be the value signaled in the ran-PagingCycle2.

DRX is a technology to reduce power consumption of the UE in the RRC_idle mode or RRC_inactive mode in the NR system. The UE may perform reception operation to receive a paging signal from a BS. The paging signal may refer to a paging message or a short message (an indicator to indicate that system information has changed or indicator to indicate ETWS or CMAS notification). However, the paging signal is not frequently transmitted, so when the reception operation is continued even while the paging signal is not transmitted, the power consumption may increase. Hence, reception of the paging signal may be tried periodically at particular points in time to reduce the power consumption, which may correspond to the DRX. The paging timing may be referred to as a paging occasion (PO). The PO refers to a set of PDCCH monitoring occasions, which may include a plurality of time slots (for example, a slot may be a subframe or an OFDM symbol) in which paging DCI is transmitted. In the NR system, DRX operations of UEs in the RRC_idle mode or RRC_inactive mode are performed according to the following equations 1 and 2: The SFN is incremented by 1 for every radio frame. When the paging signal is transmitted in a radio frame that satisfies the corresponding equation, the UE performs the reception operation based on the DRX. The radio frame may be referred to as a paging frame (PF). A PF may include one or more POs or starting points of POs (firstPDCCH-MonitoringOccasionOfPO). A PO involved in a PF may start in the PF or in a radio frame after the PF.

$$(SFN+PF\_\text{offset}) \bmod T = (T \text{ div } N)*(UE\_ID \bmod N) \quad \text{Equation 1}$$

The equation 1 may express calculation of a PF for a paging signal.

$$i\_s = \text{floor}(UE\_ID/N) \bmod Ns \quad \text{Equation 2}$$

The equation 2 may express calculation of a PO for the paging signal.

In the equations 1 and 2,
the system frame number (SFN) may have 10 bits. Furthermore, the most significant bit (MSB) of the 10-bit SFN may be in systemFrameNumber of an MIB, and four least significant bits (LSBs) of the SFN may be delivered in a PBCH transmission block as part of channel coding. (The most significant bit (MSB) of the 10-bit SFN is in systemFrameNumber in MIB and the 4 LSB of the SFN are conveyed in the PBCH transport block as part of channel coding).

T may refer to a DRX cycle of the UE. (DRX cycle of the UE)

N may refer to the number of total PFs in T. (number of total paging frames in T)

Ns may refer to the number of POs for a PF. (number of paging occasions for a PF. ENUMERATED {four, two, one})

PF_offset may refer to an offset used for PF determination. (offset used for PF determination)

UE_ID may refer to 5G-S-Temporary Mobile Subscriber Identity (TMSI) mod 1024.

In this case, when the UE is in the RRC_idle mode, a value of T may be determined in the embodiment of the disclosure as described above in connection with FIG. 1G. When the UE is in the RRC_inactive mode, a value of T may be determined in the embodiment of the disclosure as described above in connection with FIG. 1I. Values of Ns, firstPDCCH-MonitoringOccasionofPO, nAndPaging-FrameOffset, and default DRX Cycle may be provided in SIB1. The UE may derive the aforementioned parameters N and PF_offset from nAndPagingFrameOffset. When the UE has no 5G-S-TMSI, the UE may derive PF and i_s by putting '0' into UE_ID in the equations 1 and 2. When firstPDCCH-MonitoringOccasionOfPO is signaled in SIB1, PDCCH monitoring occasions for the paging signal may be determined according to pagingSearchSpace and firstPDCCH-MonitoringOccasionOfPO. Otherwise, when SearchSpaceId is set to '0' in pagingSearchSpace, PDCCH monitoring occasions for the paging signal may be equal to an RMSI (or SIB1) defined in chapter 13 of the 3GPP TS 38.213. Specifically, when SearchSpaceId is set to '0' in pagingSearchSpace, Ns may have the value of '1' or '2'. When Ns is '1', only one PO may exist in a PF, and the PO may start in the first PDCCH monitoring occasion. When Ns is '2', there may be a PO existing in a PF; when i_s derived according to the equation 2 is '0', a PO may exist in the first half of the PF, and when i_s derived according to the equation 2 is '1', a PO may exist in the second half of the PF. When SearchSpaceId is set to a value other than '0' in pagingSearchSpace, the UE may use i_s derived according to the equation 2 to monitor the (i_s+1)th PO. In this case, the PO may refer to a set of 'S' successive PDCCH monitoring occasions, where 'S' is the number of SSBs determined based on ssb-PositionInBurst in SIB1 for transmission. The kth PDCCH monitoring occasion for paging in the PO may correspond to an SSB transmitted in the 10th place. The PDCCH monitoring occasions for paging which do not overlap with UL symbols are sequentially numbered from zero starting from the first PDCCH monitoring occasion in the PF When firstPDCCH-MonitoringOccasionOfPO is present, the starting PDCCH monitoring occasion number of (i_s+1)th PO is the (i_s+1)th value of the firstPDCCH-MonitoringOccasionOfPO parameter. When firstPDCCH-MonitoringOcassionofPO is not signaled, a starting point of PDCCH monitoring in the (i_s+1)$^{th}$ PO may correspond to i_s*S.

The DRX may be equally applied to the LTE system. In the LTE system, the UE in the RRC_idle mode or RRC_inactive mode may try paging signal reception periodically at particular points in time to reduce the power consumption of the UE, and such an operation may correspond to the DRX. The paging timing may be referred to as a PO. On the contrary to the NR system, in the LTE system, a PO may refer to a subframe, which may include a P-RNTI transmitted on a PDCCH or an MPDCCH. In the LTE system, DRX operations of UEs in the RRC_idle mode or RRC_inactive mode may be performed according to the following equation 3. The SFN is incremented by 1 for every radio frame. When the paging signal is transmitted in a radio frame that satisfies the corresponding equation, the UE performs the reception operation based on the DRX. The radio frame may be referred to as a PF.

$$SFN \bmod T = \mathrm{div}*(UE\_ID \bmod N) \qquad \text{Equation 3}$$

In the equation 3,

The SFN may have 10 bits (MSB 8 bits may be explicit and LSB 2 bits may be implicit). (10 bits (MSB 8 bits explicit, LBS 2 bits implicit))

T may refer to a DRX cycle of the UE. (DRX cycle of the UE)

N may refer to min (T, nB).

nB may be 4T, 2T, T, T/2, T/4, T/8, T/16, T/32, T/64, T/128, or T/256, and for NB-IoT, T/512, or T/1024. (4T, 2T, T, T/2, T/4, T/8, T/16, T/32, T/64, T/128, and T/256, and for NB-IoT also T/512, and T/1024).

Ns may be max (1, nB/T).

UE_ID may be 5G-S-TMSI mod 1024 when the UE supports Evolved Universal Mobile Telecommunications System Terrestrial Radio Access (E-UTRA) connected to the 5G core (5GC), the NAS instructs to use the 5GC for a selected cell, and a P-RNTI is monitored on the PDCCH. The 5G-S-TMSI may be a unique number assigned to each UE.

On the other hand, when a P-RNTI is monitored on the PDCCH, the UE_ID may be IMSI mod 1024. The IMSI may be a unique number assigned to each UE.

8 bits in a mater information block (MIB) on a physical broadcast channel (PBCH) represent the SFN. T and nB are values that may be provided in SIB2. In an embodiment of the disclosure, T may have one of {rf32, rf64, rf128, and rf256}, where rf32 indicates 32 radio frame length. That is, rf32 means 320 ms.

```
PCCH-Config ::=         SEQUENCE {
    defaultPagingCycle     ENUMERATED {
                              rf32, rf64, rf128, rf256},
    nB                     ENUMERATED {
                              fourT, twoT, oneT, halfT, quarterT,
                              oneEighthT, oneSixteenthT,
                              oneThirtySecondT}
}
```

A DRX cycle T actually applied in the above equation may be derived through coordination between the UE, the BS, and the AMF (or the MME). When the UE is in the RRC_idle mode, one of a UE specific paging cycle and a default paging cycle broadcast in system information may be applied for the T according to the following rules:

<Rule 1> when the UE is allocated a UE-specific DRX value in an ATTCH or TAU procedure and the allocated UE-specific DRX value is smaller than rf512, the DRX cycle T may be determined to be the shortest of the allocated UE-specific DRX value and the default DRX value broadcast in the system information (e.g., SIB2).

when the UE is allocated a UE-specific DRX value from an upper layer device through an ATTCH or TAU procedure and the allocated UE-specific DRX value is rf512 or rf1024, the allocated UE-specific DRX value may be applied as the DRX cycle T (T=512 or 1024).

when the UE is not allocated a UE-specific DRX value from an upper layer device because the UE has not performed the ATTACH or TAU procedure, the DRX cycle may be determined to be the default DRX value broadcast in the system information (e.g., SIB2).

When the UE is in the RRC_inactive mode, T may be determined by applying one of the following rules. The disclosure proposes introduction of a longer DRX cycle to the suspend configuration information (rrc-InactiveConfig) included in an RRC connection release message received from the BS when the UE switches into the RRC_inactive mode. In an embodiment of the disclosure, ran-PagingCycle2 may be introduced, and ran-PagingCycle2 may have a value of one of {rf512 and rf1024}.

<Rule 2> when only the ran-PagingCycle2, or both the ran-PagingCycle2 and ran-PagingCycle are included in the suspend configuration information received by the UE, or when the UE is not allocated the UE-specific DRX value from an upper layer device because the UE has not performed the ATTCH or TAU procedure, i$^B$ a DRX cycle T may be determined to be a value signaled in the ran-PagingCycle2 (T=ran-PagingCycle2).

when only the ran-PagingCycle2, or both the ran-PagingCycle2 and ran-PagingCycle are included in the suspend configuration information received by the UE, or when the UE is allocated a UE-specific DRX value from an upper layer device through the ATTCH or TAU procedure, the DRX cycle T may be determined to be the shortest of the allocated UE-specific DRX value and a value signaled in the ran-PagingCycle2.

when the ran-PagingCycle2 is not included in the suspend configuration information received by the UE, T may be determined to be the shortest of the default DRX value broadcast in the system information (e.g., SIB2), the UE-specific DRX value allocated from an upper layer device, and a value signaled in the ran-PagingCycle. When at least some of the aforementioned values are not present, the UE may determine a DRX cycle to be the shortest of the values to be compared or values signaled/allocated/broadcast.

<Rule 3> when only the ran-PagingCycle2, or both the ran-PagingCycle2 and ran-PagingCycle are included in the suspend configuration information received by the UE, or when the UE is not allocated the UE-specific DRX value from an upper layer device because the UE has not performed the ATTCH or TAU procedure, i$^B$ a DRX cycle may be determined to be a value signaled in the ran-PagingCycle2 (T=ran-PagingCycle2).

when only the ran-PagingCycle2, or both the ran-PagingCycle2 and ran-PagingCycle are included in the suspend configuration information received by the UE, or when the UE is allocated a UE-specific DRX value from an upper layer device in the ATTCH or TAU procedure, when the shortest of the value signaled in the ran-PagingCycle2 and the allocated UE-specific DRX value is rf512 or rf1024, a shorter one may be determined for the DRX cycle.

when the shortest of the value signaled in the ran-PagingCycle2 and the allocated UE-specific DRX value is shorter than rf512, the DRX cycle may be determined to be the shortest of the default DRX value broadcast in the system information (e.g., SIB2), the UE-specific DRX value allocated from an upper layer device, and the value signaled in the ran-PagingCycle2, or the shorter one of a shorter one of the UE-specific DRX value allocated from the upper layer device and the value signaled in the ran-PagingCycle2.

when the ran-PagingCycle2 is not included in the suspend configuration information received by the UE, the DRX cycle T may be determined to be the shortest of the default DRX value broadcast in the system information (e.g., SIB2), the UE-specific DRX value allocated from an upper layer device, and a value signaled in the ran-PagingCycle. When at least some of the aforementioned values are not present, the UE may determine a DRX cycle to be the shortest of the values to be compared or values signaled/allocated/broadcast.

The UE in the RRC_idle mode or RRC_inactive mode may determine the DRX cycle, T by applying the above rules. Accordingly, the UE in the RRC_idle mode or RRC_inactive mode and the BS may select the same DRX cycle, and the BS may transmit a paging signal to the UE after determining a PF based on the DRX cycle.

In the LTE system, a subframe in which to deliver the paging is set in a PF. The UE monitors its actual paging in a paging subframe in the PF derived in the above equation. A paging subframe may be called a PO. The PO is derived in the following equation 4:

$$i\_s = \text{floor}(UE\_ID/N) \bmod Ns \qquad \text{Equation 4}$$

Using the value of i_s calculated in the equation 4, a PO of the UE may be determined from a table in chapter 7.2 of the standard document "3GPP TS 36.304: User Equipment (UE) procedures in idle mode".

Figure 1J:
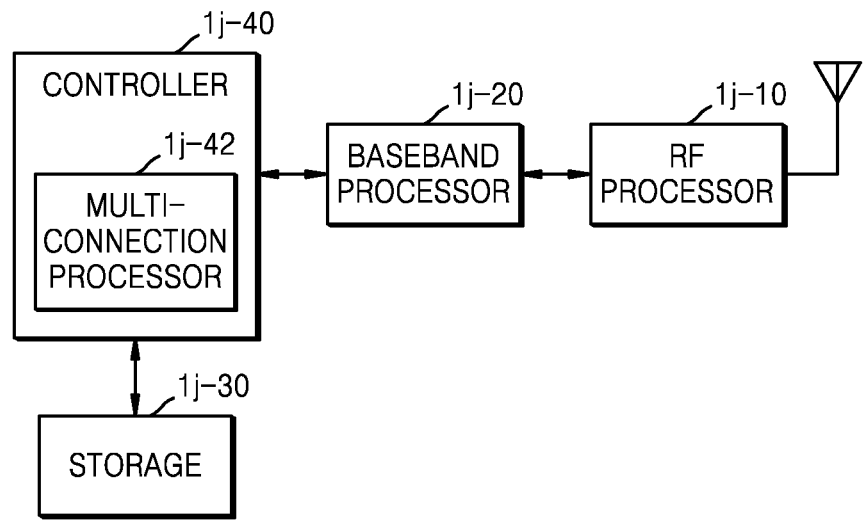
FIG. 1J is a block diagram illustrating an internal structure of a UE, according to an embodiment of the disclosure.

FIG. 1J is a block diagram illustrating an internal structure of UE, according to an embodiment of the disclosure.

Referring to FIG. 1J, a UE may include a radio frequency (RF) processor 1j-10, a baseband processor 1j-20, a storage 1j-30, and a controller 1j-40.

The RF processor 1j-10 may perform functions for transmitting or receiving signals on a wireless channel, such as band conversion or amplification of the signals. Specifically, the RF processor 1j-10 may perform up conversion on a baseband signal provided from the baseband processor 1j-20 to an RF band signal and transmit the resultant signal through an antenna and down conversion on an RF band signal received through an antenna to a baseband signal. For example, the RF processor 1j-10 may include a transmit filter, a receive filter, an amplifier, a mixer, an oscillator, a digital to analog converter (DAC), an analog to digital converter (ADC), etc. Although a single antenna is shown in FIG. 1j, the UE may be equipped with multiple antennas. The RF processor 1j-10 may also include multiple RF chains. Furthermore, the RF processor 1j-10 may perform beamforming. For beamforming, the RF processor 1j-10 may adjust the phase and amplitude of the respective signals transmitted or received through the multiple antennas or antenna elements. Furthermore, the RF processor 1j-10 may perform multiple-input-multiple-output (MIMO), and may receive a number of layers during the MIMO operation.

The baseband processor 1j-20 may perform a conversion function between a baseband signal and a bitstream according to a physical layer standard of the system. For example, for data transmission, the baseband processor 1j-20 may generate complex symbols by encoding and modulating a bitstream for transmission. Furthermore, upon reception of data, the baseband processor 1j-20 may reconstruct a received bitstream by demodulating and decoding a baseband signal provided from the RF processor 1j-10. For example, when conforming to an OFDM method, for data transmission, the baseband processor 1j-20 may generate complex symbols by encoding and modulating a bitstream for transmission, map the complex symbols to subcarriers, and then reconstruct OFDM symbols by inverse fast Fourier transform (IFFT) operation and cyclic prefix (CP) insertion. Furthermore, upon reception of data, the baseband processor 1$j$-20 may divide a baseband signal provided from the RF processor 1$j$-10 into OFDM symbols, reconstruct signals mapped to subcarriers through fast Fourier transform (FFT), and restore a received bitstream by demodulation and decoding.

The baseband processor 1$j$-20 and the RF processor 1$j$-10 may transmit and receive signals as described above. Hence, the baseband processor 1$j$-20 and the RF processor 1$j$-10 may be called a transmitter, a receiver, a transceiver, or a communicator. Furthermore, at least one of the baseband processor 1$j$-20 or the RF processor 1$j$-10 may include multiple communication modules to support many different radio access technologies. In addition, at least one of the baseband processor 1$j$-20 or the RF processor 1$j$-10 may include different communication modules to process different frequency band signals. For example, the different radio access technologies may include a wireless local area network (WLAN, e.g., IEEE 802.11) technology, a cellular network technology (e.g., LTE), etc. Furthermore, the different frequency bands may include a super high frequency (SHF) band, e.g., 2.5 GHz, 5 Ghz, and millimeter wave (mmwave) band, e.g., 60 GHz.

The storage 1$j$-30 may store a basic program for operation of the UE, an application program, data such as configuration information. In particular, the storage 1$j$-30 may store information regarding a second access node that performs wireless communication using a second radio access technology. The storage 1$j$-30 may provide data stored therein at the request of the controller 1$j$-40.

The controller 1$j$-40 may include a multi-connection processor 1$j$-42. The controller 1$j$-40 may control general operation of the UE. For example, the controller 1$j$-40 may transmit or receive signals by means of the baseband processor 1$j$-20 and the RF processor 1$j$-10. The controller 1$j$-40 may also record or read data onto or from the storage 1$j$-30. For this, the controller 1$j$-40 may include at least one processor. For example, the controller 1$j$-40 may include a communication processor (CP) for controlling communication and an application processor (AP) for controlling an upper layer, such as an application program.

Figure 1K:
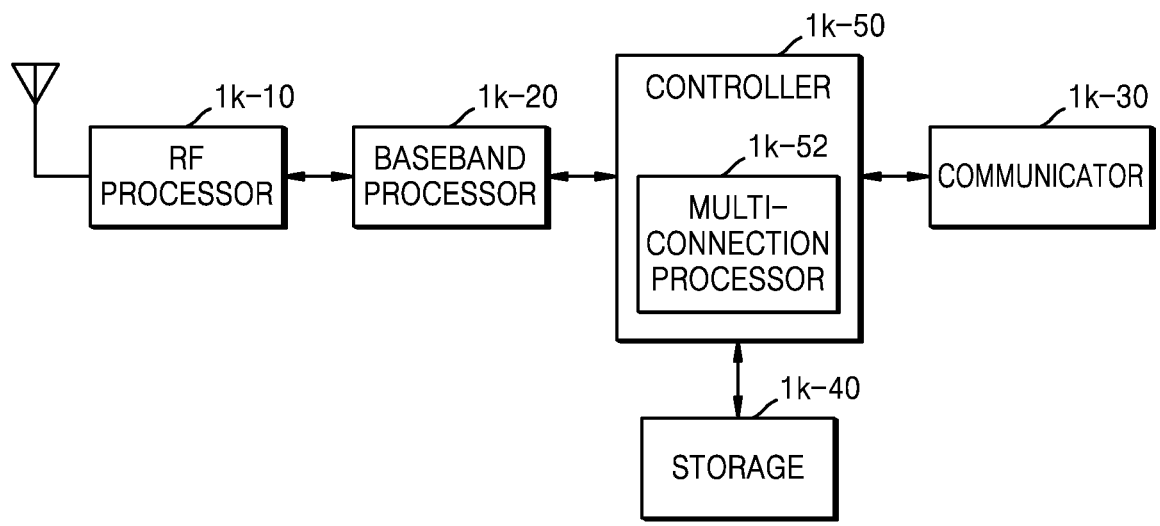
FIG. 1K shows a structure of a new radio (NR) base station, according to an embodiment of the disclosure.

FIG. 1K shows a structure of an NR BS, according to an embodiment of the disclosure.

Referring to FIG. 1$k$, the BS may include an RF processor 1$k$-10, a baseband processor 1$k$-20, a backhaul communicator 1$k$-30, a storage 1$k$-40, and a controller 1$k$-50.

The RF processor 1$k$-10 may perform functions for transmitting or receiving signals on a wireless channel, such as band conversion or amplification of the signals. Specifically, the RF processor 1$k$-10 may perform up conversion on a baseband signal provided from the baseband processor 1$k$-20 to an RF band signal and transmit the resultant signal through an antenna and down conversion on an RF band signal received through an antenna to a baseband signal. For example, the RF processor 1$k$-10 may include a transmit filter, a receive filter, an amplifier, a mixer, an oscillator, a DAC, an ADC, etc. Although a single antenna is shown in FIG. 1K, a first access node may include multiple antennas. The RF processor 1$k$-10 may also include multiple RF chains. Furthermore, the RF processor 1$k$-10 may perform beamforming. For beamforming, the RF processor 1$k$-10 may adjust the phase and amplitude of the respective signals transmitted or received through the multiple antennas or antenna elements. The RF processor 1$k$-10 may perform down MIMO operation by transmitting one or more layers.

The baseband processor 1$k$-20 may perform conversion between a baseband signal and a bitstream according to a physical layer standard of a first radio access technology. For example, for data transmission, the baseband processor 1$k$-20 may generate complex symbols by encoding and modulating a bitstream for transmission. Furthermore, upon reception of data, the baseband processor 1$k$-20 may reconstruct a received bitstream by demodulating and decoding a baseband signal provided from the RF processor 1$k$-10. For example, when conforming to an OFDM method, for data transmission, the baseband processor 1$k$-20 may generate complex symbols by encoding and modulating a bitstream for transmission, map the complex symbols to subcarriers, and then reconstruct OFDM symbols by IFFT operation and CP insertion. Furthermore, upon reception of data, the baseband processor 1$k$-20 may divide a baseband signal provided from the RF processor 1$k$-10 into OFDM symbols, reconstruct signals mapped to subcarriers through FFT operation, and restore a received bitstream by demodulation and decoding. The baseband processor 1$k$-20 and the RF processor 1$k$-10 may transmit and receive signals as described above. Hence, the baseband processor 1$k$-20 and the RF processor 1$k$-10 may be called a transmitter, a receiver, a transceiver, a communicator, or a wireless communicator.

The backhaul communicator 1$k$-30 may provide an interface for communicating with other nodes in the network. Specifically, the backhaul communicator 1$k$-30 may convert a bitstream to be transmitted from this primary BS to another node, e.g., a secondary BS, a core network, etc., into a physical signal, and convert a physical signal received from another node.

The storage 1$k$-40 may store a basic program for operation of the primary BS, an application program, data such as configuration information. In particular, the storage 1$k$-40 may store information about a bearer allocated to a connected UE, measurements reported from the UE, etc. Furthermore, the storage 1$k$-40 may store information used as a criterion for determining whether to provide or stop multi-connection for the UE. The storage 1$k$-40 may provide data stored therein at the request of the controller 1$k$-50.

The controller 1$k$-50 may include a multi-connection processor 1$k$-52. The controller 1$k$-50 may control general operation of the primary BS. For example, the controller 1$k$-50 may transmit or receive signals through the baseband processor 1$k$-20 and the RF processor 1$k$-10 or the backhaul communicator 1$k$-30. The controller 1$k$-50 may also record or read data onto or from the storage 1$k$-40. For this, the controller 1$k$-50 may include at least one processor.

Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM, a non-volatile memory including a flash memory, a read only memory (ROM), an electrically erasable programmable ROM (EEPROM), a magnetic disc storage device, a compact disc (CD)-ROM, a digital versatile disc (DVD) or other types of optical storage device, and/or a magnetic cassette. Alternatively, the programs may be stored in a memory including a combination of some or all of them. The memory may be provided in a multiple number.

The program may also be stored in an attachable storage device that may be accessed over a communication network including the Internet, an intranet, a Local Area Network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Embodiments of the disclosure provide an apparatus and method of effectively providing a service in a mobile communication system.

The embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure, which have been provided only for illustrative purposes. Furthermore, the embodiments of the disclosure may be operated by being combined with one another when necessary. For example, an embodiment of the disclosure and some of another embodiment of the disclosure may be combined to operate the BS and the UE. Although the embodiments of the disclosure are proposed based on a frequency division duplex (FDD) LTE system, modifications to the embodiments of the disclosure, which do not deviate from the scope of the disclosure, may be applicable to other systems such as a time division duplex (TDD) LTE system, a 5G or NR system, or the like.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a radio resource control (RRC) release message including suspension configuration for switching to an RRC inactive state, wherein the suspension configuration includes a first radio access network (RAN) paging cycle;
   in case that the suspension configuration further includes a second RAN paging cycle different from the first RAN paging cycle, identifying whether a UE-specific discontinuous reception (DRX) cycle is received from an access and mobility management function (AMF);
   determining a DRX cycle of the terminal among the second RAN paging cycle or the UE-specific DRX cycle based on a result of the identifying; and
   performing monitoring based on the determined DRX cycle to receive a paging message.

2. The method of claim 1, wherein
the second RAN paging cycle is greater than one of: 5120 ms or 10240 ms.

3. The method of claim 2, wherein the determining the DRX cycle of the terminal among the second RAN paging cycle or the UE-specific DRX cycle based on the result of the identifying comprises:
   in case that the UE-specific DRX cycle is received from the AMF, determining a smaller value of the second RAN paging cycle and the UE-specific DRX cycle as the DRX cycle of the terminal.

4. The method of claim 2, wherein the determining of the DRX cycle of the terminal among the second RAN paging cycle or the UE-specific DRX cycle based on the result of the identifying comprises:
   in case that the UE-specific DRX cycle is received from the AMF, and the UE-specific DRX cycle is one of 5120 ms or 10240 ms, determining a smaller value of the second RAN paging cycle and the UE-specific DRX cycle as the DRX cycle of the terminal.

5. The method of claim 2, wherein the determining of the DRX cycle of the terminal among the second RAN paging cycle or the UE-specific DRX cycle based on the result of the identifying comprises:
   in case that the UE-specific DRX cycle is not received from the AMF, determining the second RAN paging cycle as the DRX cycle of the terminal.

6. The method of claim 2, wherein the determining of the DRX cycle of the terminal among the second RAN paging cycle or the UE-specific DRX cycle based on the result of the identifying comprises:
   determining the second RAN paging cycle as the DRX cycle of the terminal, regardless of whether the UE-specific DRX cycle is received from the AMF or not.

7. The method of claim 2, further comprising:
   receiving, from the base station, system information including a default paging cycle,
   wherein the determining of the DRX cycle of the terminal among the second RAN paging cycle or the UE-specific DRX cycle based on the result of the identifying comprises:
   in case that the UE-specific DRX cycle is received from the AMF, and the UE-specific DRX cycle is one of 320 ms, 640 ms, 1280 ms or 2560 ms, determining a smaller value of the default paging cycle and the UE-specific DRX cycle as the DRX cycle of the terminal.

8. A terminal in a wireless communication system, the terminal comprising:
   a transceiver; and
   at least one processor configured to:
   receive via the transceiver, from a base station, a RRC (radio resource control) release message including suspension configuration for switching to RRC inactive state, wherein the suspension configuration includes a first RAN (radio access network) paging cycle,
   in case that the suspension configuration further includes a second RAN paging cycle different from the first RAN paging cycle, identify whether a UE-specific discontinuous reception (DRX) cycle is received from an access and mobility management function (AMF), determine a DRX cycle of the terminal from among at least one of the second RAN paging cycle or the UE-specific DRX cycle based on a result of the identifying, and perform a monitoring based on the determined DRX cycle to receive a paging message.

9. The terminal of claim 8, wherein:

the second DRX cycle is equal to or greater than one of 5120 ms or 10240 ms.

10. The terminal of claim 9, wherein the at least one processor is further configured to:

in case that the UE-specific DRX cycle is received from the AMF, determine a smaller value of the second RAN paging cycle and the UE-specific DRX cycle as the DRX cycle of the terminal.

11. The terminal of claim 9, wherein the at least one processor is further configured to:

in case that the UE-specific DRX cycle is received from the AMF, and the UE-specific DRX cycle is one of 5120 ms or 10240 ms, determine a smaller value of the second RAN paging cycle and the UE-specific DRX cycle as the DRX cycle of the terminal.

12. The terminal of claim 9, wherein the at least one processor is further configured to:

in case that the UE-specific DRX cycle is not received from the AMF, determine the second RAN paging cycle as the DRX cycle of the terminal.

13. The terminal of claim 9, wherein the at least one processor is further configured to:

determine the second RAN paging cycle as the DRX cycle of the terminal, regardless of whether the UE-specific DRX cycle is received from the AMF or not.

14. The terminal of claim 9, wherein the at least one processor is further configured to:

receive via the transceiver, from the base station, system information including a default paging cycle, and in case that the UE-specific DRX cycle is received from the AMF, and the UE-specific DRX cycle is one of 320 ms, 640 ms, 1280 ms or 2560 ms, determine a smaller value of the default paging cycle and the UE-specific DRX cycle as the DRX cycle of the terminal.

* * * * *